(12) United States Patent
Pineo et al.

(10) Patent No.: US 11,237,016 B2
(45) Date of Patent: Feb. 1, 2022

(54) MAP-BASED TRIP TRAJECTORY AND DATA INTEGRATION SYSTEM

(71) Applicant: GE Aviation Systems LLC, Grand Rapids, MI (US)

(72) Inventors: Richard Eddy Pineo, Portland, OR (US); Kyle James Pope, Portland, OR (US); Megan Zoe Potter, Portland, OR (US); Austin David McDaniel, Austin, TX (US); Kristopher Evans Adler, Mountain View, CA (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 163 days.

(21) Appl. No.: 16/537,889

(22) Filed: Aug. 12, 2019

(65) Prior Publication Data
US 2020/0003579 A1 Jan. 2, 2020

Related U.S. Application Data

(63) Continuation of application No. 15/376,740, filed on Dec. 13, 2016, now Pat. No. 10,415,992.

(51) Int. Cl.
*G01C 23/00* (2006.01)
*G01C 21/20* (2006.01)

(52) U.S. Cl.
CPC .......... *G01C 23/005* (2013.01); *G01C 21/20* (2013.01)

(58) Field of Classification Search
CPC ... G01C 23/005; G01C 21/20; G06F 16/9537; G06F 16/29
See application file for complete search history.

(56) References Cited

U.S. PATENT DOCUMENTS

| 6,259,977 | B1 | 7/2001 | Mayer et al. |
| 7,876,238 | B2 | 1/2011 | Vandenbergh et al. |
| 8,386,100 | B1* | 2/2013 | Lie ...................... G08G 5/0026 701/14 |
| 8,527,190 | B2 | 9/2013 | Mere et al. |
| 8,793,070 | B2 | 7/2014 | Stenbrock et al. |
| 8,862,287 | B1* | 10/2014 | Clark ..................... G01C 23/00 701/3 |
| 9,177,479 | B2* | 11/2015 | Castillo-Effen ...... G08G 5/0034 |
| 2003/0132860 | A1 | 7/2003 | Feyereisen et al. |

(Continued)

FOREIGN PATENT DOCUMENTS

| CN | 105488040 A | 4/2016 |
| CN | 106202554 A | 12/2016 |

*Primary Examiner* — Rami Khatib
(74) *Attorney, Agent, or Firm* — Dority & Manning, P.A.

(57) ABSTRACT

Systems and methods for mapping trip trajectories include identifying one or more vehicle trips (e.g., aircraft flights). One or more trajectory configurations associated with at least a portion of each vehicle trip can be identified, and location data associated with the one or more vehicle trips can be requested. Trip trajectory data based at least in part from the location data associated with the one or more vehicle trips and the one or more trajectory configurations associated with at least a portion of each vehicle trip can be generated. The trip trajectory data can be provided for display on a map of a geographic area including one or more locations defined by the location data associated with the one or more vehicle trips.

20 Claims, 9 Drawing Sheets

(56) References Cited

U.S. PATENT DOCUMENTS

| | | | |
|---|---|---|---|
| 2012/0245834 A1* | 9/2012 | Klooster | G08G 5/0039 |
| | | | 701/120 |
| 2013/0057414 A1* | 3/2013 | Nutaro | G08G 5/0021 |
| | | | 340/958 |
| 2013/0131888 A1* | 5/2013 | Nutaro | G08G 5/065 |
| | | | 701/1 |
| 2014/0114557 A1* | 4/2014 | Nutaro | G08G 5/0013 |
| | | | 701/121 |
| 2014/0375690 A1 | 12/2014 | Jung et al. | |
| 2015/0154874 A1* | 6/2015 | Murthy | G08G 5/06 |
| | | | 701/120 |
| 2015/0177018 A1 | 6/2015 | Gueziec et al. | |
| 2015/0298817 A1* | 10/2015 | Jackson | G08G 5/065 |
| | | | 701/3 |
| 2015/0348423 A1 | 12/2015 | Chaubey et al. | |
| 2016/0012736 A1* | 1/2016 | Nutaro | G08G 5/065 |
| | | | 701/3 |

\* cited by examiner

MAP-BASED TRIP TRAJECTORY AND DATA INTEGRATION SYSTEM

CROSS-REFERENCE TO RELATED APPLICATION

This application is a continuation of U.S. patent application Ser. No. 15/376,740, filed Dec. 13, 2016, titled "MAP-BASED TRIP TRAJECTORY AND DATA INTEGRATION SYSTEM," the entirety of which is hereby incorporated by reference.

FIELD

The present subject matter relates generally to automated systems and methods for determining map-based implementations of trip trajectories and associated trip parameter data.

BACKGROUND

Vast quantities of data are generally available related to performance tracking for transportation fleets and individual assets. For example, the aviation industry gathers aircraft operational data from a variety of particular sources. Data can be collected from aircraft via Quick Access Recorders (QARs), which can provide airborne recordation of raw flight data parameters received from a number of aircraft sensors and avionic systems. Raw flight data parameters can include, for example, location data defining aircraft trajectories as well as other sensed parameters related to aircraft performance and the like.

Predictive analysis of vehicle operational data (e.g., aircraft flight data) can offer useful information for maintenance and prognostics for individual vehicles or entire fleets. This information can benefit engineers, managers, or other specialists within a vehicle maintenance organization who help solve various vehicle and/or fleet maintenance problems. Many existing systems rely primarily on human interpretation of these vast amounts of data, which can be cumbersome, tedious and time consuming. In addition, there are limitations with visualizing fleet data in mass in a manner that accommodates meaningful analysis, such as comparison of aircraft data across multiple flights.

BRIEF DESCRIPTION

Aspects and advantages of embodiments of the present disclosure will be set forth in part in the following description, or may be learned from the description, or may be learned through practice of the embodiments.

One example aspect of the present disclosure is directed to a computer-implemented method for mapping trip trajectories. The method includes identifying, by one or more computing devices, one or more vehicle trips. The method also includes identifying, by the one or more computing devices, one or more trajectory configurations associated with at least a portion of each vehicle trip. The method also includes requesting, by the one or more computing devices, location data associated with the one or more vehicle trips. The method also includes generating, by the one or more computing devices, trip trajectory data based at least in part from the location data associated with the one or more vehicle trips and the one or more trajectory configurations associated with at least a portion of each vehicle trip. The method also includes providing for display, by the one or more computing devices, the trip trajectory data on a map of a geographic area including one or more locations defined by the location data associated with the one or more vehicle trips.

Another example aspect of the present disclosure is directed to a map-based trip trajectory system. The system includes a display device configured to provide output data in the form of one or more graphical user interfaces for receiving user instructions. The system also includes an input device configured to receive input data provided to the one or more graphical user interfaces provided on the display device, the input data identifying one or more vehicle trips, one or more first trip trajectory configurations associated with one or more of a first portion of the one or more vehicle trips or a first set of vehicle trips, and one or more second flight trajectory configurations associated with one or more of a second portion of the one or more vehicle trips or a second set of vehicle trips. The system also includes one or more processors and one or more memory devices, the one or more memory devices storing computer-readable instructions that when executed by the one or more processors cause the one or more processors to perform operations. The operations include requesting location data associated with the one or more vehicle trips. The operations also include generating trip trajectory data based at least in part from the location data associated with the one or more vehicle trips, the one or more first trip trajectory configurations, and the one or more second trip trajectory configurations. The operations also include providing for display on the display device the trip trajectory data on a map of a geographic area including one or more locations defined by the location data associated with the one or more vehicle trips.

Yet another example aspect of the present disclosure is directed to one or more tangible, non-transitory computer-readable media storing computer-readable instructions that implement an application programming interface for obtaining flight trajectory data executed on one or more computing devices. The one or more computing devices having one or more processors and at least one display device. The application programming interface includes instructions for identifying, by a software application associated with the one or more computing devices, one or more aircraft flights and one or more flight trajectory configurations. The application programming interface also includes instructions for generating, by the software application, a query string that comprises one or more flight identifiers indicative of the one or more aircraft flights. The application programming interface also includes instructions for requesting, by the software application, location data associated with the one or more aircraft flights. The one or more computing devices provide for display on the display device the location data associated with the one or more aircraft flights on a map of a geographic area including one or more locations defined by the location data associated with the one or more aircraft flights.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
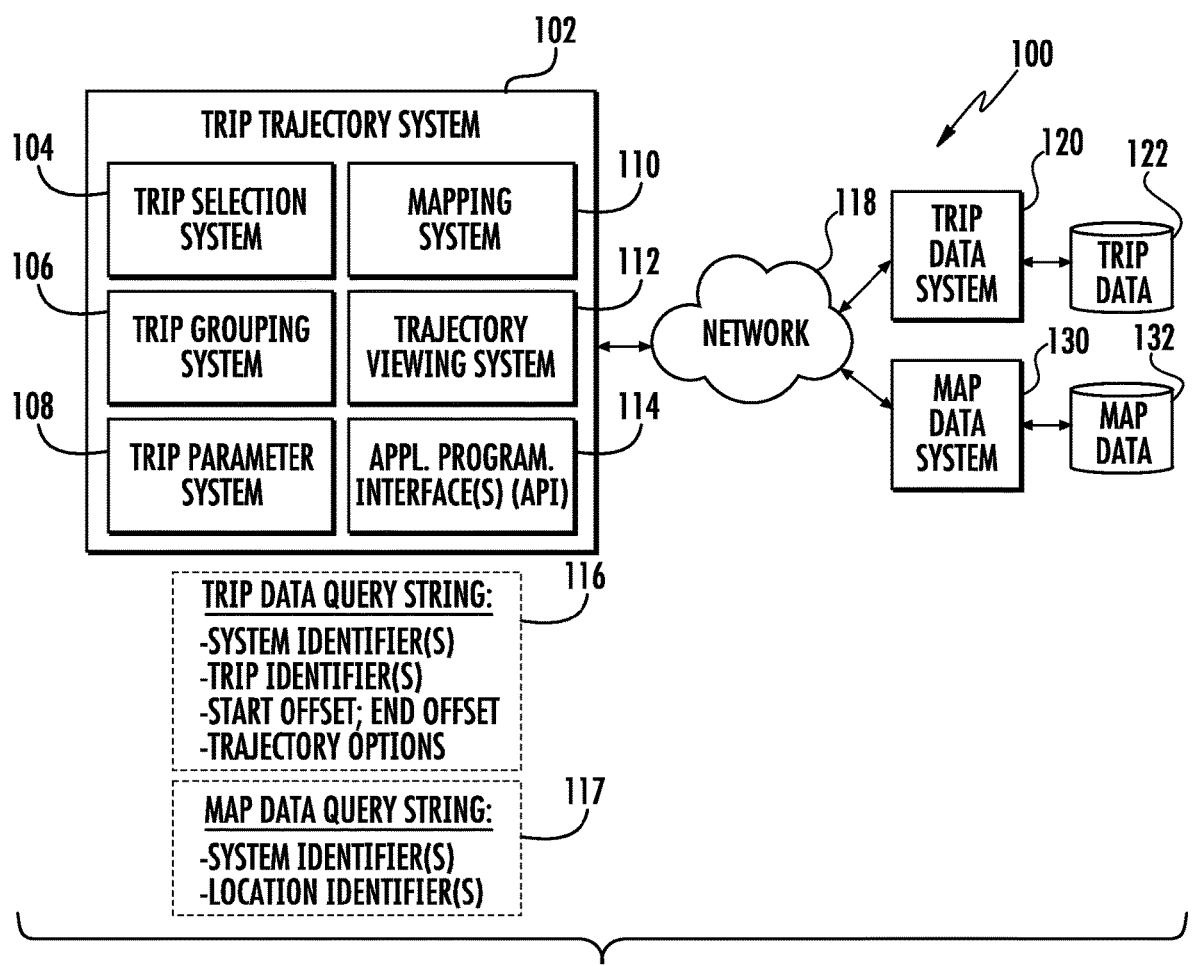
FIG. 1 depicts an example trip trajectory and data integration system overview according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for mapping and analyzing trip trajectories for a fleet of vehicles (e.g., aircraft, helicopter, automobile, boat, submarine, train, and/or any other suitable vehicles.) Location data (e.g., latitude, longitude, altitude values) corresponding to particular vehicle trips (e.g., aircraft flights) can be requested via an application programming interface (API) in communication with a trip data system. Trajectory configurations can be specified for portions of the vehicle trips that indicate a manner in which trip trajectory data associated with the location data for the vehicle trips should be generated. The trip trajectory data can be provided for display on a map of a geographic area including one or more locations defined by the location data associated with the vehicle trips.

In more particular example embodiments, various options can be provided by which one or more vehicle trips can be identified for analysis in accordance with the disclosed technology. For example, one or more unique trip identifiers can be received for respective vehicle trips from input data provided via a graphical user interface. In another example, input data from a graphical user interface can indicate user selection of vehicle trips from a graphical display (e.g., a plot or chart) of multiple vehicle trips. In some examples, a display device is configured to provide output data in the form of one or more graphical user interfaces for receiving user instructions indicating identified vehicle trips.

Location data associated with one or more identified vehicle trips can be requested, for example, from a trip data system coupled to a database of trip data including location data as well as other trip parameters. In some examples, a query string that includes trip identifiers indicative of identified vehicle trips for display and analysis can be generated. In some examples, the query string also can include one or more system identifiers indicative of the trip data system from which the location data is requested. The location data associated with the vehicle trips then can be requested from a trip data system based at least in part on the query string including the trip identifiers and/or system identifiers.

Trajectory configurations (e.g., different patterns, colors and/or visual indicators) can be identified for at least a portion of each vehicle trip. In some examples, one or more first trip trajectory configurations and one or more second different trip trajectory configurations can be identified. In some examples, the first trip trajectory configurations can be associated with a first group of one or more first vehicle trips, while the second trip trajectory configurations can be associated with a second group of one or more second vehicle trips. Any number of different trajectory configurations and corresponding number of groups of vehicle trips can be specified, and trips can be moved from one group to another as specified by user input. In some examples, the first trip trajectory configurations can be associated with a first portion of one or more vehicle trips and the second trip trajectory configurations can be associated with a second portion of the one or more vehicle trips. Trip trajectory data can be generated based at least in part from the location data associated with the one or more vehicle trips, the one or more first trip trajectory configurations and the one or more second trip trajectory configurations. This causes the trip trajectory data that is provided for display to have different configurations in accordance with the different first and second trip trajectory configurations. In some examples, the trip trajectory data and map data associated with the map on which the trip trajectory data is provided for display are both provided in the same rendering format (e.g., a keyhole markup language (KML) file format).

Trip parameters related to the identified vehicle trips also can be identified and used to augment display of location data within a map-based trip trajectory. Example trip parameters can include but are not limited to parameters recorded or derived from the vehicle data or engine data recorders on a vehicle describing some aspects of a trip, such as control inputs or surfaces, trip dynamics, (e.g., speeds or vibrations) or state logic (e.g. APU or autopilot enabled on a flight). Trip parameter data can be parametric (varying by time) or located at a particular time and place on a trip path. Inclusion of trip parameter data within trip trajectories can beneficially leverage the great wealth of information that may be recorded or derived from vehicle trips (e.g., flight data and/or engine data recorded on an aircraft).

Parameter configurations associated with at least a portion of each trip parameter also can be identified and used to generate trip trajectory data. In some examples, parameter configurations can include a mapping formula for mapping values for one or more trip parameters to a visual spectrum. For instance, a visual spectrum can be defined in terms of different colors for different parameter values or in terms of lines of varied lengths representative of different parameter values positioned (e.g., perpendicularly) along a trajectory line representing location data for a vehicle trip. In some examples, parameter configurations can include icon definitions for indicating trip parameter data at one or more times or locations along a trip trajectory. Even further trip parameter data can be provided for display upon receipt of data indicative of user selection of one or more selected vehicle trips from the trip trajectory data, thus providing more detailed information about particular selected trips.

The systems and methods described herein may provide a number of technical effects and benefits. For instance, systems and methods for mapping trip trajectories can have a technical effect of facilitating aggregation and understanding of large amounts of trip data that are recorded by vehicles. Features for visualizing multiple trips at once (e.g., hundreds or even thousands of flights at a time) can help determine greater understanding of trip dynamics (e.g., the airspace of an airport or flight patterns for a commercial fleet of aircraft). Visualization in a map-based system provides concrete improvements over conventional trip data provided in strip charts and/or tabular data which can be difficult for non-engineers to interpret. Comparison of multiple trips relative to one another using conventional systems can be extremely challenging. However, the disclosed embodiments provide features for viewing trip trajectory data in a manner that accommodates more meaningful interpretation and understanding. In particular, display of trip trajectory data overlaid on a map allows immediate recognition when an artifact of interest has some relation to geography and is useful when comparing the trip trajectory characteristics of a group of vehicles. Features can thus be provided for investigating individual trips to determine causality and/or multiple trips to determine commonality of trip parameters and the like.

The disclosed features for mapping trip trajectories can advantageously allow data engineers to harness the value in recorded data to present ideas effectively. By showing visually the locations at which various aspects of trips (e.g., flights) occur, it can be much easier to communicate the desired behavior of an approach or landing. Being able to display trip trajectories and/or associated parameter data using parametric coloring can illustrate the behavior of a fleet before and after a process change. Additionally or alternatively, generated trip trajectory data can contrast more effective versus less effective operating procedures, thus providing value to solving operating problems. In addition, clustering can be applied to a large data set in a manner that can identify data trends that may have been hidden beforehand. One plausible scenario is to display a set of related events to determine causality based on location. For example, turbulence events in aircraft flight may cluster around a certain mountain range, or engine surge events may occur near certain climates or geographical features. These valuable visualizations can enable engineers to communicate stories found in trip data to non-engineers, such as pilots, fleet managers, vehicle buyers, and/or decision makers for fleets, trips, maintenance, and the like. The types of data generation and visualization possible with the disclosed features can be extremely valuable both in terms of sales as well as when searching for solutions for real-world problems.

The disclosed systems and methods for mapping trip trajectories can have an additional technical effect of providing highly customizable groupings of vehicles, trips and/or related parameters as well as display configurations pertaining to such items or their dynamic groupings. For example, particular trips and/or groups of trips can be identified by user selection either directly by typing in a unique trip identifier or indirectly by selecting trips from a secondary view into the data, such as lassoing dots from a scatter plot or clicking on a bar in a bar chart to select the trips for which trajectory data can be generated and provided for display. In addition to fundamental technology of viewing trajectories, data groupings can be created with different configurations (e.g., predetermined and/or customizable labeling and/or coloring) to contrast between different sets of trips, vehicles, parameters, etc. Features can also be provided to select a trip or trips in a displayed set and retrieve further information about those particular trips. That trip information then can be used to identify subsequent actions such as indicating particular vehicles that require maintenance, contacting a flight crew or other trip team to learn more about what happened, or otherwise drill down into that trip to search for causality.

The disclosed systems and methods for mapping trip trajectories can have a still further technical effect of providing visual data mining and communication capabilities that were not known to be possible with previous tools. The disclosed technology can accommodate a flight data analysis system that can render this type of visualization interactively. An example of data mining is to render all of the flights landing in a particular airport and select one or more that are interesting in the hopes of uncovering inefficiencies or safety risks. Selection tools can allow for clicking on a trajectory and using metadata associated with that flight as a key into other analysis tools. Flight commonalities, causalities, or other lessons can be learned based on drilling into a particular aberrant trip or trips.

The systems and methods of the present disclosure also provide an improvement to computing technology by providing a centralized and streamlined computer-based solution for generating and displaying trip trajectory data across multiple vehicles and/or trips. In particular, the disclosed features for mapping trip trajectories can provide a streamlined trajectory solution that distills multiple tools into a single web page, allowing for virtually instantaneous view of trajectories based on trip data. Responsive display of trip data (e.g., lat/long or other location data for one or many trips) on a web page coupled to trip data and/or mapping data can be facilitated through the coordinated utilization of one or more integrated application programming interfaces. This solution is more efficient, provides more effective data, and is dynamic in nature. For instance, new trips can be dynamically added to sets for viewing or configurations can be dynamically changed such as coloring or the like without a need to start over from the beginning every time a new trip trajectory configuration is desired. A responsive graphical user interface can render trip trajectory configurations within seconds of configuration changes, and can accommodate data exploration in an understandable and efficient way. As such, unique interactivity provided by the disclosed systems and methods can allow a user to tune what is shown and selected in a graphical user interface tool more easily and in an advantageous manner.

Example aspects of the present disclosure may be discussed with reference to aircraft related data and other avionic systems associated with an aircraft for purposes of illustration and discussion. Those of ordinary skill in the art, using the disclosures provided herein, will understand that the subject matter described herein can be used with other asset-related systems including fleets of vehicles other than aircraft without deviating from the scope of the present disclosure. In particular, discussion of aircraft herein can be generally applied to vehicles other than aircraft, and discussion of aircraft flights can be generally interchangeable with other vehicle trips and vice versa.

Referring now to the figures, FIG. 1 depicts an example overview of a trip trajectory and data integration system 100, that includes integrated system components such as a trip trajectory system 102, a trip data system 120 and a map data system 130. The trip trajectory system 102 can include multiple components, including but not limited to a trip selection system 104, a trip grouping system 106, a trip parameter system 108, a mapping system 110, a trajectory viewing system 112, and one or more application programming interfaces (APIs) 114. The APIs 114 are configured to generate one or more query strings 116/117 which can be communicated via one or more networks 118 to trip data system 120 and/or map data system 130. One or more portions of trip data 122 requested from trip data system 120 and/or one or more portions of map data 132 requested from map data system 130 can be provided via network 118 back to trip trajectory system 102 in a variety of trip trajectory configurations as described herein. The network 118 can be any type of communications network, such as a local area network (e.g. intranet), wide area network (e.g. Internet), cellular network, or some combination thereof. The network 118 can also include a direct connection. In general, communication can be carried via network 118 using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Referring more particularly to trip trajectory system 102, a trip selection system 104 is configured to identify one or more vehicle trips for analysis in accordance with the disclosed technology. For example, trip selection system 104 can utilize one or more input/output (I/O) devices to receive instructions identifying one or more vehicle trips. In some examples, a display device can provide output data in the form of one or more graphical user interfaces for receiving instructions from a user and/or from a computing device or system. An input device can receive input data provided to the one or more graphical user interfaces provided on the display device. The input data can identify one or more vehicle trips selected within trip selection system 104. In some instances, input data can directly specify vehicle trips by providing one or more unique trip identifiers for respective vehicle trips from input data provided via a graphical user interface. Unique trip identifiers can be provided in a variety of suitable formats, such as a concatenation of one or more alphanumeric identifiers including a fleet designator, a trip designator, an operational suffix, etc. In other instances, input data from a graphical user interface can indirectly specify vehicle trips by user selection of vehicle trips from a graphical display (e.g., a plot or chart) of multiple vehicle trips. For example, dots can be lassoed from a scatter plot or bars can be clicked in a bar chart to select the trips for which trajectory data can ultimately be generated and provided for display.

A trip grouping system 106 can be provided to create data groupings relative to the vehicle trips selected via trip selection system 104. Different data groupings can be created based on different sets of trips, different vehicles, different vehicle parameters, trip parameters or other data items. Groupings data can be mapped to different visual configurations (e.g., different labels and/or colors) to contrast between different groups in trajectory viewing system 112. Trip groupings established via trip grouping system 106 can be specified by a user or set in accordance with predefined groups that are automatically populated after trips are selected via trip selection system 104. For example, at least one first group and at least one second group can be identified using trip grouping system 106. In some examples, the first group can include one or more first vehicle trips, while a second group can include one or more second vehicle trips. For instance, a first group of one or more vehicle trips can include trips during a period of time before a particular operational protocol is implemented, while a second group of one or more vehicle trips can include trips during a period of time after the particular operational protocol is implemented. This provides options for contrasting different trips to better analyze relative changes in trip performance. In some examples, the first group can include a first portion of one or more vehicle trips while a second group can include a second portion of the same one or more vehicle trips. For instance, a first portion of one or more vehicle trips can correspond to a portion of aircraft flights when landing gear is deployed, while a second portion of the one or more vehicle trips can correspond to a portion of the same aircraft flights when landing gear is not deployed. Any number of different groups of vehicle trips or portions of vehicle trips can be specified using trip grouping system 106, and trips, vehicles, parameters or portions thereof can be moved from one group to another as specified by user input. Different groups can be independently selected such that they can be shown or hidden using trajectory viewing system 112.

Trip parameter system 108 can be provided to identify one or more trip parameters related to the identified vehicle trips from trip selection system 104 for which additional data is ultimately desired for augmenting trip trajectories via trajectory viewing system 112. In some examples, parameter data associated with trip parameters identified within trip parameter system 108 can augment display of location data within a map-based trip trajectory. Example trip parameters identified using trip parameter system 108 can include but are not limited to parameters recorded or derived from vehicle data or engine data recorders on a vehicle describing some aspects of a trip, such as control inputs or surfaces, trip dynamics, (e.g., speeds or vibrations) or state logic (e.g. APU or autopilot enabled on a flight). Trip parameter data associated with trip parameters identified using trip parameter system 108 can be parametric (varying by time) or located at a particular time and place on a trip path. Inclusion of trip parameter data within trip trajectories can beneficially leverage the great wealth of information that may be recorded or derived from vehicle trips (e.g., flight data and/or engine data recorded on an aircraft). Additional examples of trip parameters that can be selected via trip parameter system 108 can include any type of trip data 122 as further described in FIG. 2.

The trip selection system 104, trip grouping system 106 and/or trip parameter system 108 can be variously used to specify different configurations for identified vehicle trips, groupings, and/or trip parameters. For example, different trajectory configurations (e.g., different colors and/or visual indicators) can be identified for at least a portion of each vehicle trip selected via trip selection system 104. In some examples, different trajectory configurations can be defined for different groups identified via trip grouping system 106. For example, a first trip trajectory configuration can include a first color or style for trip trajectory data associated with a first group while a second trajectory configuration can include a second different color or style for trip trajectory data associated with a second group. In this manner, trip trajectory data that is provided for display can ultimately have different configurations in accordance with the different first and second trip trajectory configurations.

Trip parameter system 108 can identify trip parameter configurations associated with at least a portion of identified trip parameters. In some examples, parameter configurations selected via trip parameter system 108 can include a mapping formula for mapping values for one or more trip parameters to a visual spectrum. For instance, a visual spectrum can be defined in terms of different colors for different parameter values or in terms of lines of varied lengths representative of different parameter values positioned (e.g., perpendicularly) along a line representing location data for a vehicle trip. In some examples, parameter configurations selected via trip parameter system 108 can include icon definitions for indicating trip parameter data at one or more times or locations along a trip trajectory. Even further trip parameter data can be provided for display upon receipt of data indicative of user selection of one or more selected vehicle trips from the trip trajectory data, thus providing more detailed information about particular selected trips.

Referring still to FIG. 1, mapping system 110 corresponds to a portion of trip trajectory system 102 that can be configured to communicate with map data system 130 to retrieve determined map data 132 for generating specific trip trajectories in accordance with the disclosed technology. Mapping system 130 can define and request map data 132 that includes one or more geographic areas associated with location data for the one or more vehicle trips identified via trip selection system 104. Mapping system 130 can retrieve map data 132 that is defined using a variety of formats, including but not limited to GeoRSS, KML (Keyhole Markup Language), Geography Markup Language (GML), GeoJSON and map data from any source using OGC-standards such as Web Map Service (WMS) or Web Feature Service (WFS). Map data system 130 hosting map data 132 can be associated with a variety of mapping services for providing geographic map data to a user, such as for example, Bing Maps, MapQuest, GoogleMaps and others.

Trajectory viewing system 112 can generate trip trajectory data based on trip data 122 retrieved from trip data system 120 and can combine the trip trajectory data with associated map data 132 retrieved from map data system 130. Trip trajectory data can include location data associated with various trip trajectories and/or associated trip parameters generated in a rendering format that is compatible with map data and a viewing format as defined by the various trajectory configurations and/or trip parameter configurations. For example, vehicle trips identified via trip selection system 104 can be color coded appropriately based on group membership identified via trip grouping system 106. The trajectory viewing system 112 can then provide the generated trip trajectory data on a map of a geographic area including one or more locations defined by the location data associated with the one or more vehicle trips for display on a display device. The map of a geographic area can be provided in a variety of formats such as a navigational representation, aerial/satellite imagery representation, terrain representation, or other map-based depiction. The trip trajectory data generated by trajectory viewing system 112 as well as associated map data 132 can both be provided in the same rendering format (e.g., a keyhole markup language (KML) file format). Trajectory viewing system 112 can be implemented as a web-based software application that is provided on a network-accessible platform, such as in a browser connected to the Internet (e.g., network 118). Trajectory viewing system 112 can include a view manager for integrating and coordinating user navigation among one or more different view portions of a graphical user interface provided within a browser window for displaying the map-based trip trajectory data.

Application programming interface(s) 114 can be used at least in part to access trip data 122 and/or map data 132 that is used to generate the trip trajectory data within trajectory viewing system 112. For example, a trip data application programming interface (API) can be used to request specific trip data 122 from trip data system 120. Similarly, a map data API can be used to request specific map data 132 from map data system 130.

One or more portions of trip trajectory system 102 (e.g., trajectory viewing system 112) can generate a trip data query string 116, which can include one or more identifiers. In some examples, trip data query string 116 can include, for example, one or more system identifiers for specifying a particular trip data system 120 from which trip data 122 is desired. In some examples, trip data query string 116 can include, for example, one or more unique trip identifiers for identifying vehicle trips for which location data is desired. Start offsets and/or stop offsets can also be specified within trip data query string 116 to identify specific portions of each uniquely identified trip. Trajectory configurations can also be specified within trip data query string 116 in order to retrieve trip data 122 in a particular rendering format. Trip data 122 including location data and/or trip parameter data then can be retrieved from trip data system 120 based at least in part on the identifiers included in trip data query string 116.

One or more portions of trip trajectory system 102 (e.g., mapping system 130) can generate a mapping query string 117, which can include one or more identifiers. In some examples, mapping query string 117 can include, for example, one or more system identifiers for specifying a particular map data system 130 from which map data 132 is desired. In some examples, mapping query string 117 can include, for example, one or more location identifiers defining a geographic area that includes one or more locations defined by the location data associated with the one or more vehicle trips identified via trip selection system 104. Map data 132 including map portions of specified geographic areas then can be retrieved from map data system 130 based at least in part on the identifiers included in map query string 117.

Figure 2:
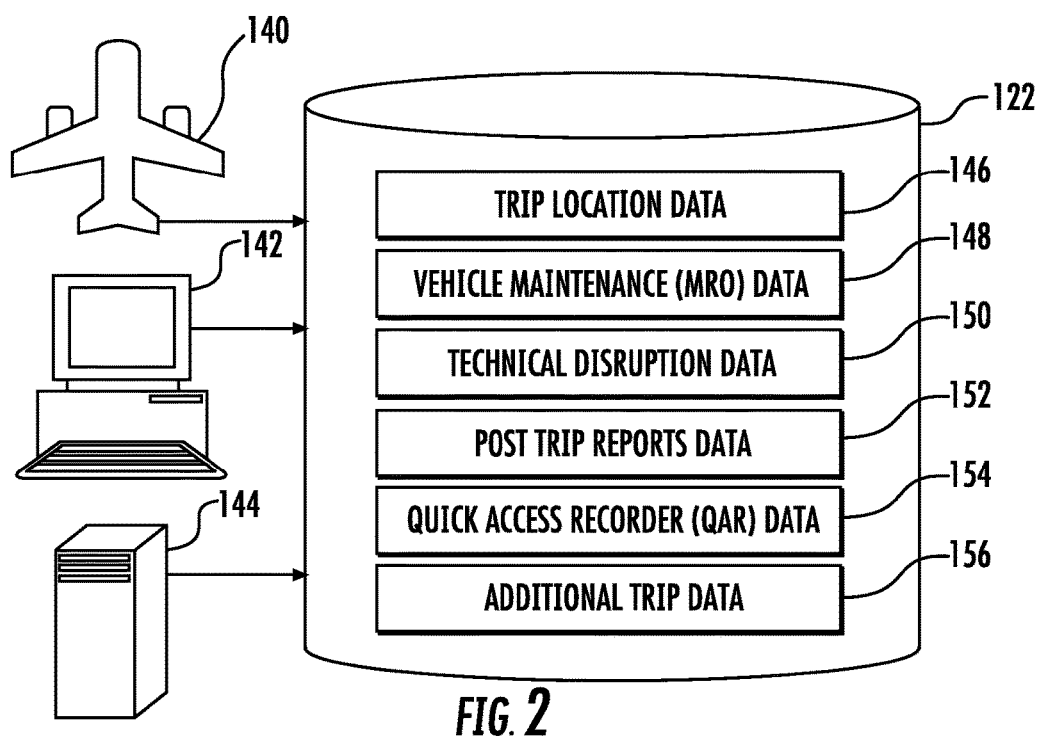
FIG. 2 depicts an example overview of system components associated with a trip data system according to example aspects of the present disclosure.

FIG. 2 depicts more particular aspects of a database for storing trip data 122. Portions of data from one or more vehicle-related data sources can be gathered from sensors, user input or other data collection features within a vehicle 140, a client computing device 142, and/or server computing device 144 and collected within a database storing trip data 122. Data originating from vehicle 140 and computing devices 142/144 can be accumulated before a trip, during a trip and/or after a trip and can include data gathered automatically by vehicle sensors and other vehicle systems or data that is manually downloaded from a vehicle or manually entered by drivers, pilots, engineers, controllers, maintenance personnel, or other specialists assisting with vehicle-related activities and analysis. In some examples, such individuals can access one or more client computing devices 142 onboard a vehicle or one or more server computing devices 144 in a remote location from the vehicle to provide vehicle-related trip data 122.

Figure 3:
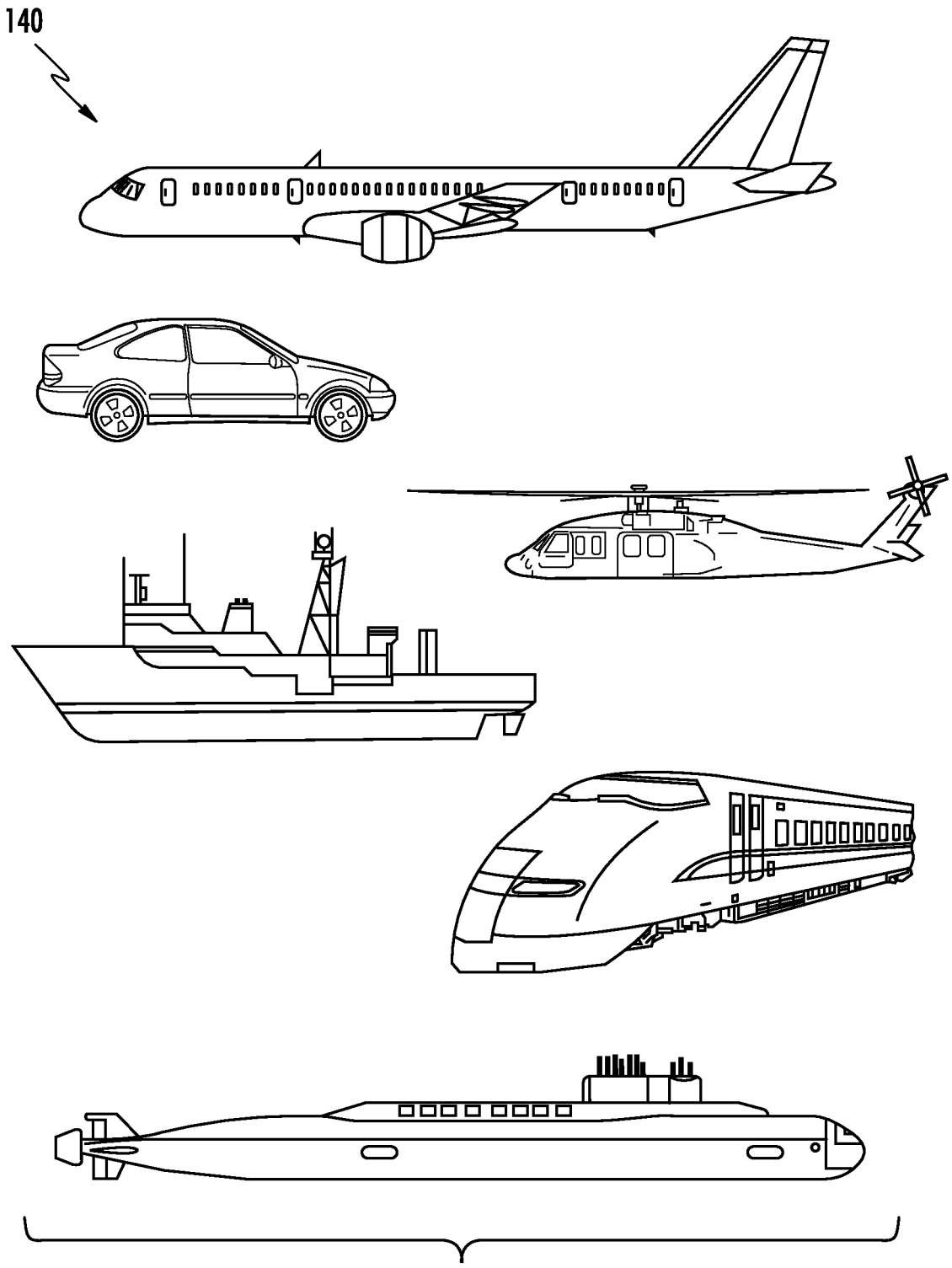
FIG. 3 depicts example vehicles for which trip trajectory mapping can be implemented according to example aspects of the present disclosure.

Although FIG. 2 depicts example vehicle 140 as an aircraft, it should be appreciated that the systems and methods of the present disclosure can be implemented relative to other vehicles. For example, FIG. 3 illustrates additional or alternative vehicles 140 for which trip data 122 can be gathered and which can incorporate features of the disclosed technology. For example vehicles 140 can include but are not limited to aircraft, helicopter, automobile, boat, submarine, train, car, truck, bus and/or any other suitable vehicles. Trip data gathered at database 122 can be collected from a variety of particular sources. For example, when trip data gathered at database 122 includes aircraft flight data, such data can be maintained by one or more particular airlines, by general aviation tracking systems, by third party data collection and analysis entities authorized by an airline or other organization to track relevant data, or other entities.

Trip database 122 can include different specific types of vehicle-related data. For example, trip location data 146 can include location data identifying different locations of a vehicle for respective vehicle trips. In some examples, the trip location data 146 can include specific geographic location data, such as latitude, longitude and/or altitude values of a vehicle at different points along a trip path. In some examples, the trip location data 146 can be time-correlated location data such that each instance of recorded location data has an associated timestamp. Trip location data 146 can be determined, for example, by one or more location sensors provided at each vehicle. Location sensors configured to determine trip location data 146 can determine actual and/or relative position by using, for example, a satellite navigation positioning system (e.g. a GPS system, a Galileo positioning system, the Global Navigation Satellite System (GNSS), the BeiDou Satellite Navigation and Positioning system), an inertial navigation system, a dead reckoning system, based on IP address, by using triangulation and/or proximity to cellular towers or WiFi hotspots, beacons, and the like and/or other suitable techniques for determining position. In aircraft examples, one or more of the above location sensors or others can be provided as part of an aircraft's Flight Management System (FMS) that employs multiple location sensors (e.g., inertial reference system data, radio navigation signals and/or GPS position) to keep track of an aircraft's position.

In some examples, trip data 122 also can include vehicle maintenance data 148, technical disruption data 150, post trip reports data 152, quick access recorder (QAR) data 154, and/or additional trip data 156. Vehicle maintenance data 148 can be collected from maintenance records for a fleet of vehicles. For aircraft, vehicle maintenance data 148 can be collected from an airline's Maintenance, Repair and Overhaul (MRO) systems, and can include but is not limited to data identifying aircraft parts that have been changed recently or general wear and tear that a maintenance crew has identified. Technical disruption data 150 can include data regarding trip delays, cancellations, turn backs, trip diversions, and the like encountered during vehicle trips. Post-Trip Report (PTR) data 152 can include an electronic form of data that is collected automatically from vehicle systems and/or from information provided by driver/pilot data entry that is pertinent for tracking customized information about particular vehicle trips. Quick Access Recorder (QAR) data 154 can provide recordation of raw trip data parameters received from a number of vehicle sensors and systems. On-board systems can also be configured to continuously record data on vehicle system operation. For example, aircraft systems can be configure to record data on aircraft system operation (e.g. flaps and slats deployed, landing gear extended, thrust reversers deployed, brakes applied), and system status, performance and health (e.g. temperatures, pressures, flow rates, tank quantities, valve positions). Additional trip data 156 can originate from still further sources. For example, additional trip data 156 can correspond to additional flight data for aircraft operations that can originate from still further sources, including but not limited to pilot reports, parts removal registries, Aircraft Condition Monitoring Systems (ACMS), and/or Aircraft Communications Addressing and Reporting System (ACARS) messages that include relevant data such as aircraft movement events, flight plans, route information, weather information, equipment health, status of connecting flights, and the like.

Referring now to FIGS. 4-10, various graphical user interfaces depict trip trajectory data generated in accordance with the systems and methods described herein. The various graphical user interfaces depicted in FIGS. 4-10 can be generated, for example, via trajectory viewing system 112 of FIG. 1 and can be provided in one or more different view portions within a browser window for displaying the map-based trip trajectory data.

Figure 4:
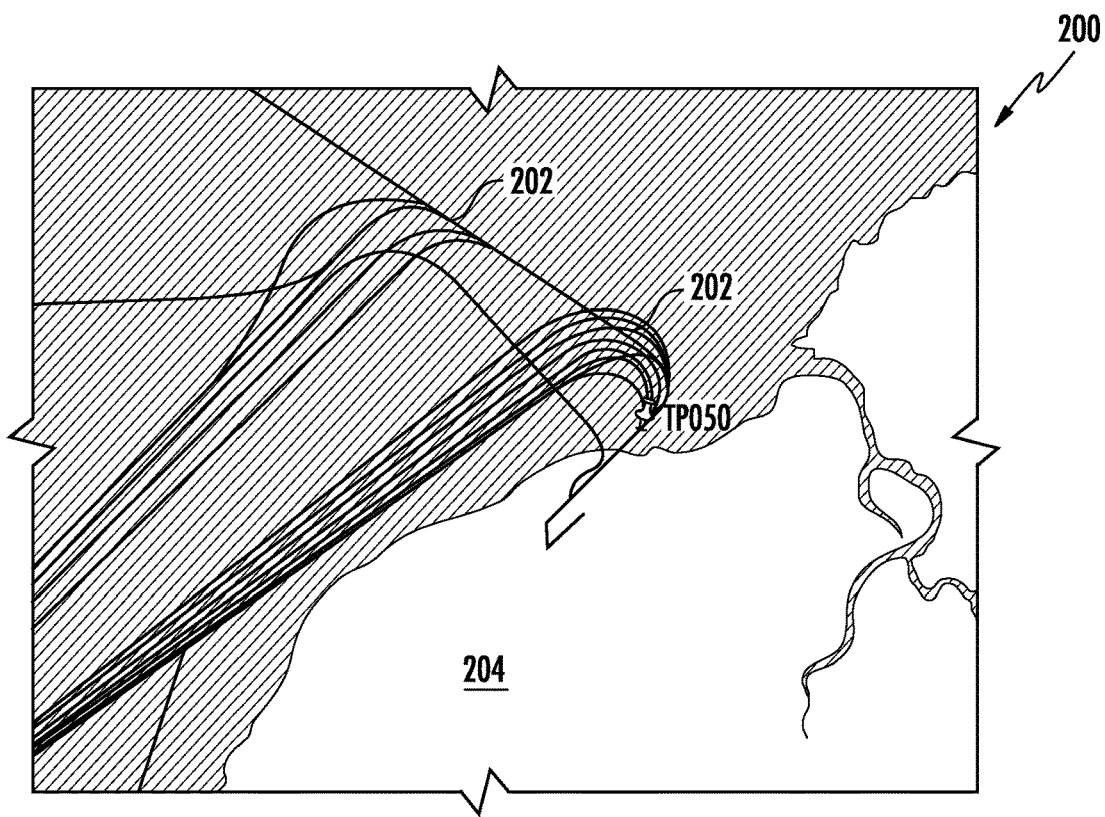
FIG. 4 provides a first example graphical user interface depicting trip trajectory data generated according to example aspects of the present disclosure.

For example, FIG. 4 depicts a first example graphical user interface 200 that depicts trip trajectory data associated with a selected group of aircraft flights approaching a given airport. In this particular example, trip selection system 104 can be utilized to select multiple aircraft flights that are associated with the given airport. The multiple aircraft flights can be selected based on flight numbers, dates (e.g., all flights in a given 24-hour period of time), or other parameters. Start offsets and/or stop offsets can be used to gather trip data associated with such flights in a manner that focuses more on flight landings. For instance, location data for identified flights can be gathered for all locations along a flight trajectory within a given radius around the airport. Trip trajectory configurations can be specified requesting that location data be provided in a particular color or pattern. Each trip trajectory 202 includes location data associated with a particular trip/flight. All trip trajectories 202 are overlaid on a map portion 204 of a geographic area encompassing location data associated with the trip trajectories 202. The example trip trajectory data depicted in FIG. 4 can be useful, for instance, to identify one or more particular aberrant flights (e.g., flights having trajectories that may have deviated from a conventional flight approach pattern). A user can then select the identified aberrant flights using interface features provided relative to graphical user interface 200, which can lead to generation of additional parameter data related to the selected flights.

Figure 5:
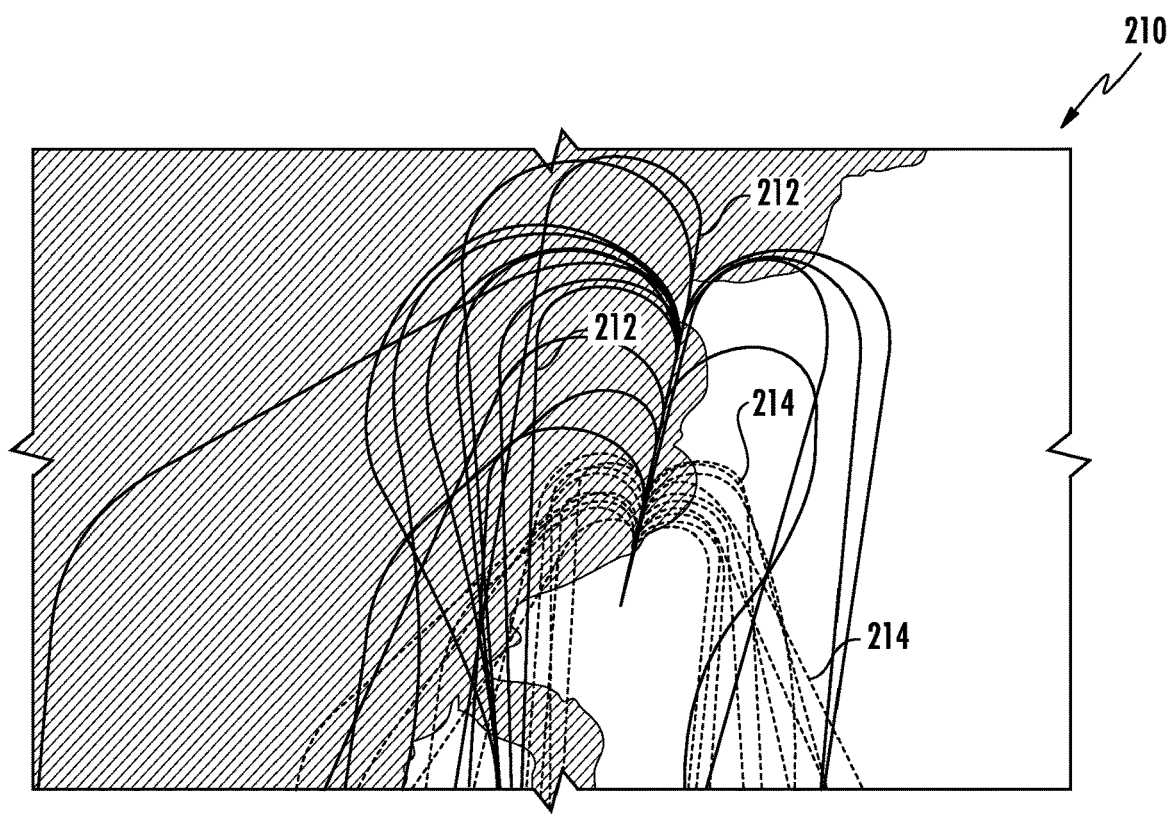
FIG. 5 provides a second example graphical user interface depicting trip trajectory data generated according to example aspects of the present disclosure.

FIG. 5 depicts a second example graphical user interface 210 that depicts trip trajectory data associated with two selected groups of aircraft flights approaching a given airport. In this particular example, trip selection system 104 and trip grouping system 106 can be utilized to select a first group of aircraft flights (e.g., as represented by flight trajectories 212) and a second group of aircraft flights (e.g., as represented by flight trajectories 214). The first group of flights (e.g., as represented by flight trajectories 212) can be associated, for example, with a date range before a particular operating procedure is implemented. The second group of flights (e.g., as represented by flight trajectories 214) can be associated with a date range after a particular operating procedure is implemented. Trip trajectory configurations can be specified requesting that location data for the first group of flights (e.g., as represented by flight trajectories 212) be provided in a particular color or pattern (e.g., solid lines as shown in FIG. 5) and that location data for the second group of flights (e.g., as represented by flight trajectories 214) be provided in a particular color or pattern (e.g., dotted lines as shown in FIG. 5). Generation of trip trajectory data as depicted in FIG. 5 can be especially useful to system users for identifying information for analyzing and evaluating effects of operating procedures on flight patterns or related aircraft data.

Figure 6:
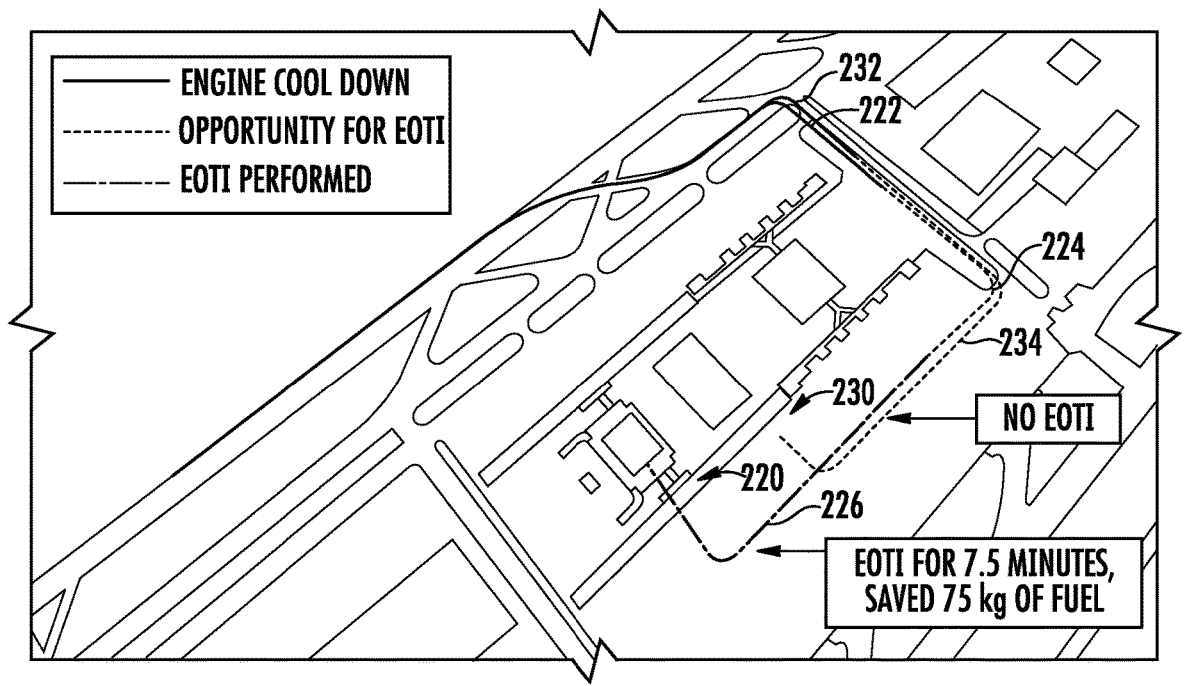
FIG. 6 provides a third example graphical user interface depicting trip trajectory data generated according to example aspects of the present disclosure.

FIGS. 6-9 depict examples of how different parameter configurations can be used to illustrate different portions of trip trajectories. For example, FIG. 6 depicts two trip trajectories 220 and 230 generated from two different aircraft flights that include color mapping for different engine use parameters. In this example, each trip trajectory 220, 230 is generated relative to an engine-off taxiing (EOT) parameter during which an aircraft can switch to operation with a single engine as opposed to dual engines while taxiing after landing. Some users may desire to analyze EOT performance to identify cost-saving measures associated with aircraft taxiing protocols. Trip trajectories 220, 230 respectively include a first trajectory portion 222, 232 corresponding to a portion of each trip trajectory 220, 230 associated with engine cool down after landing. Trip trajectories 220, 230 respectively include a second trajectory portion 224, 234 corresponding to a portion of each trip trajectory 220, 230 associated with locations/times during which EOT is available for use by the selected aircraft. Trip trajectory 220 includes a third trajectory portion 226 corresponding to a portion of trip trajectory 220 associated with locations/times during which EOT was actually employed by the selected aircraft, while the aircraft associated with trip trajectory 230 did not actually employ EOT at all during trip trajectory 230. Parameter configurations can be defined in terms of a mapping formula for mapping different operational instances of EOT to different visual features. For example, a mapping formula can define that first trajectory portions 222, 232 indicating engine cool down be shown using a first color or pattern (e.g., solid lines), while second trajectory portions 224, 234 indicating EOT opportunity be shown using a second color or pattern (e.g., dotted lines), and third trajectory portions 226 indicating actual EOT utilization be shown using a third color or pattern (e.g., dot-dashed lines). Generation of trip trajectory data as depicted in FIG. 6 can be especially useful to system users for identifying cost saving measures, such as the fact that the aircraft associated with trip trajectory 220 actually employed EOT measures for a period of time (e.g., 7.5 minutes) saving a particular quantity of fuel (e.g., 75 kg of fuel) relative to the aircraft associated with trip trajectory 230 that did not employ EOT.

Figure 7:
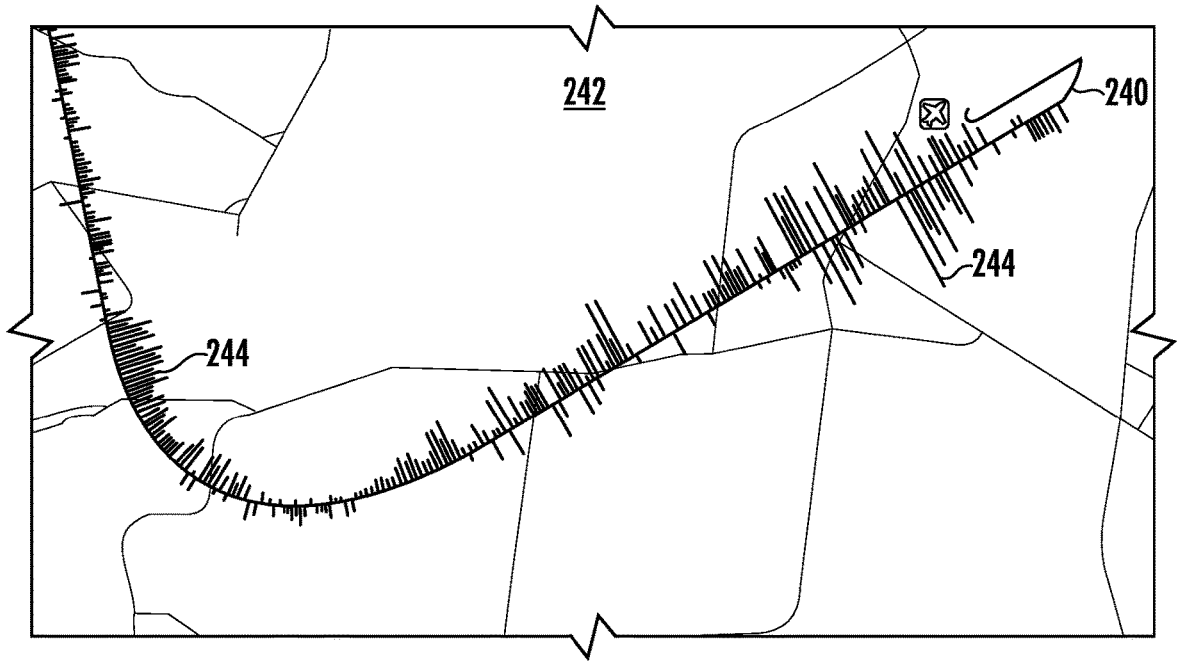
FIG. 7 provides a fourth example graphical user interface depicting trip trajectory data generated according to example aspects of the present disclosure.

FIG. 7 depicts an example trip trajectory 240 that is generated over map 242 using a parameter configuration defined relative to the particular trip parameter of aircraft roll. In this particular example, parameter values are represented at different location/time points along trip trajectory 240 using parameter value lines 244. Parameter value lines 244 have varied lengths that correlate to the changing values of aircraft roll at different points along trip trajectory 240. In this example, parameter value lines 244 are oriented in a generally perpendicular fashion relative to the direction of trip trajectory line 240. The visual differentiation in FIG. 7 accommodated by the mapping of trip trajectory 240 over map 242 with integrated trip parameter configurations depicted by parameter value lines 244 can help to illustrate helpful trajectory conclusions. In this case, a user can effectively analyze the flight data of FIG. 7 to determine that parameter value lines 244 increase when the aircraft begins a long turn as well as during adjustments made during a final approach for landing.

Figure 8:
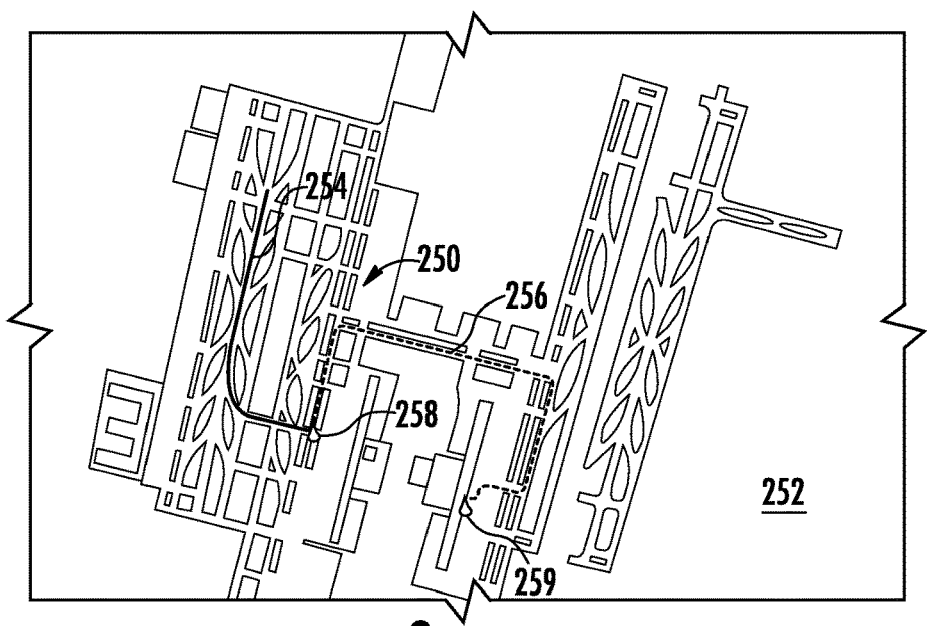
FIG. 8 provides a fifth example graphical user interface depicting trip trajectory data generated according to example aspects of the present disclosure.

FIG. 8 depicts an example trip trajectory 250 that is generated over map 252 using a parameter configuration defined relative to the particular trip parameter of EOT, such as also depicted in FIG. 6. In this particular example, parameter values (e.g., when an aircraft is engaged in dual engine operation versus single engine operation) are represented at different location/time points along trip trajectory 250 using a combination of color mapping and icons. A mapping formula can be established that maps a first portion 254 of trip parameter values (e.g., operation in a dual engine mode) to a first color/pattern (e.g., solid lines) and a second portion 256 of trip parameter values (e.g., operation in a single engine mode) to a second color/pattern (e.g., dotted lines). Icon definitions can be established such that trip trajectory 250 is generated to include an icon 258 representing the point at which an aircraft switches from operation in dual engine mode to single engine mode as well as an icon 259 representing the point at which an aircraft switches from operation in single engine mode to both engines off. Icons 258, 259 are depicted in FIG. 8 as pushpins, although it should be appreciated that icons can be defined using any number of combinations or different shapes, sizes, color and the like. Icon definitions, color mappings and/or other parameter configurations can be created using any number of specific parameters (e.g., time of last flap change, location one minute from landing, point of maximum kinetic energy, etc.) connected to the trajectories themselves.

Figure 9:
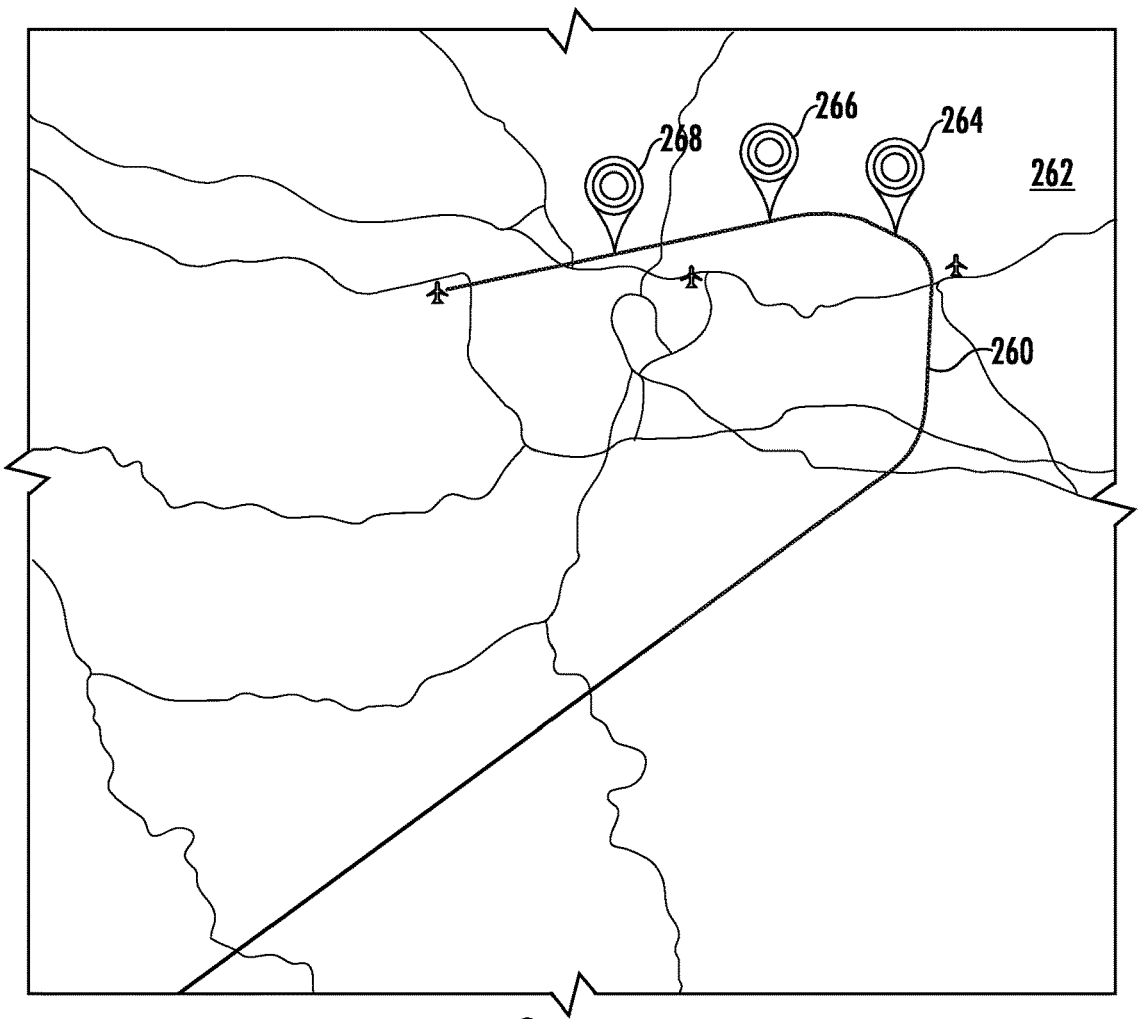
FIG. 9 provides a sixth example graphical user interface depicting trip trajectory data generated according to example aspects of the present disclosure.

FIG. 9 depicts an example trip trajectory 260 that is generated for a particular trip over map 262 using a parameter configuration defined relative to a plurality of trip parameters. Trip trajectory 260 can be generated from location data requested via a trip data query string requesting location data for an identified flight from 30 nautical miles until touchdown. A first trip parameter represented in FIG. 9 is airspeed. Parameter configurations relative to airspeed can be defined such that a color mapping is used to translate computed airspeed (CAS) to a range of colors defined relative to a color gradient scale. As such, a trajectory configuration associated with trip trajectory 260 defines color values for different CAS values at different points in time/location along trip trajectory 260. Additional trip parameters are represented along trip trajectory 260, in the form of marker icons 264, 266, and 268. A parameter configuration can be defined to identify when a last flap change occurred during flight, resulting in generation of marker icon 264 in the trip trajectory data of FIG. 9. Another parameter configuration can be defined to identify when an aircraft put its landing gear down, resulting in generation of marker icon 266 in the trip trajectory data shown in FIG. 9. A still further parameter configuration can be defined to identify when an aircraft reaches 1000 feet above ground, resulting in generation of marker icon 268 in the trip trajectory data shown in FIG. 9.

Figure 10:
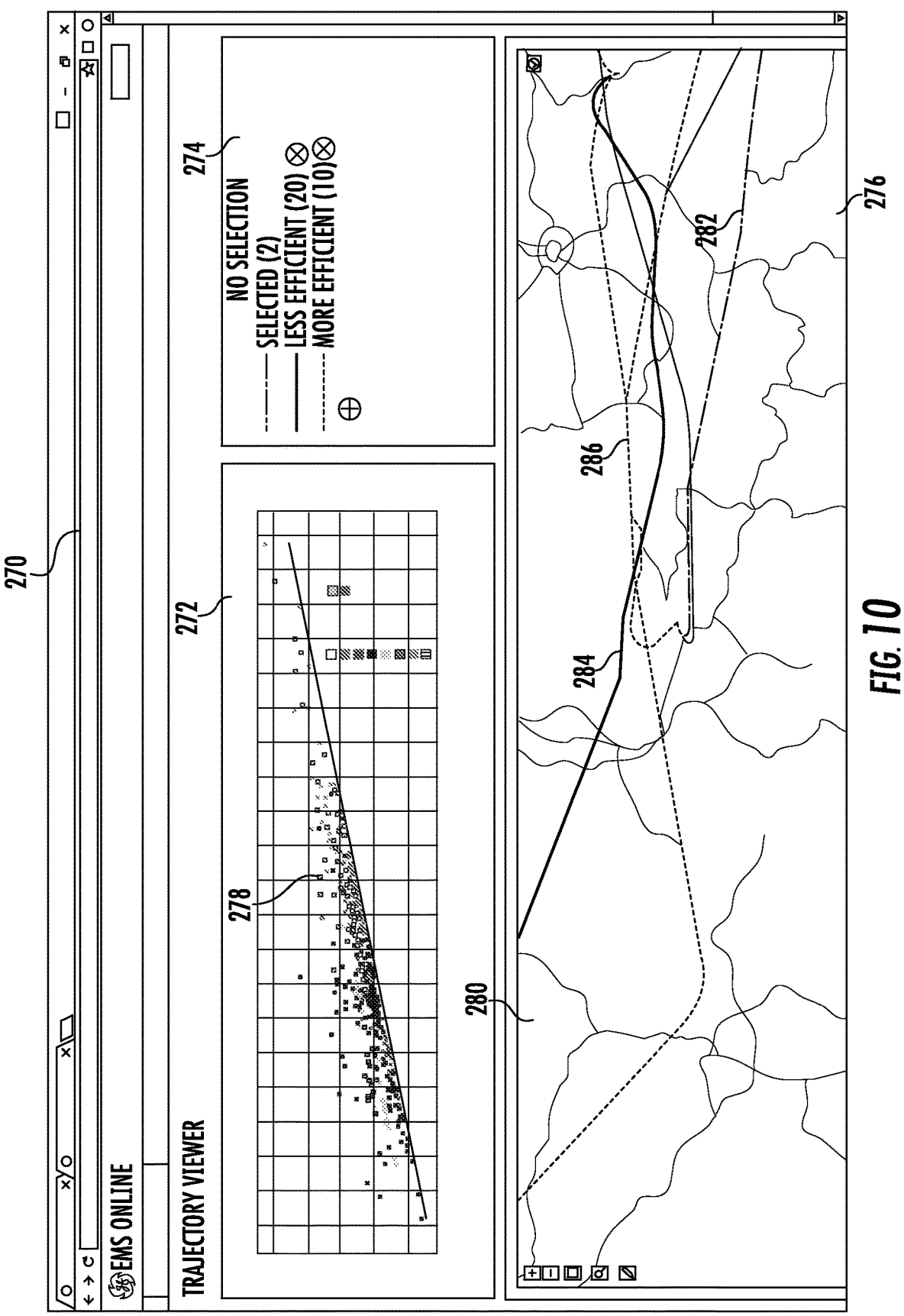
FIG. 10 provides a seventh example graphical user interface depicting trip trajectory data generated according to example aspects of the present disclosure.

FIG. 10 shows an example graphical display 270 by which vehicle trips (e.g., aircraft flights) can be indirectly specified as part of trip selection system 104. Graphical display 270 can include a primary view portion 272, a secondary view portion 274 and a tertiary view portion 276. Primary view portion 272 depicts an example portion of a graphical user interface that can be used as part of trip selection system 104. Dots 278 can represent different vehicle trips (e.g., aircraft flights), which can be selected by user interaction within primary view portion 272. Selection of dots 278 representing different aircraft flights can add selected flights to the secondary view portion 274. Secondary view portion 274 can depict an example portion of a graphical user interface that can be used as part of trip grouping system 106. For example, three groups are depicted in secondary view portion 274, namely a "Selected" group, a "Less Efficient" Group and a "More Efficient" Group. The tertiary view portion 276 can depict an example portion of a graphical user interface that can be used as part of trajectory viewing system 112. For example, tertiary view portion 276 can provide trip trajectories for the various groups identified in secondary view portion 274 on a map 280. Trip trajectory data shown in tertiary view portion 276 can be generated for a first group of flights (e.g., the "Selected" group) in accordance with a first type of trajectory configuration (e.g., a dot-dashed line style as indicated by trajectories 282, which can additionally or alternatively correspond to a first color), a second group of flights (e.g., the "Less Efficient" group) in accordance with a second type of trajectory configuration (e.g., a solid line style as indicated by trajectories 284, which can additionally or alternatively correspond to a second color), and a third group of flights (e.g., the "More Efficient" group in accordance with a third type of trajectory configuration (e.g., a dotted line style as indicated by trajectories 286, which can additionally or alternatively correspond to a third color).

Figure 11:
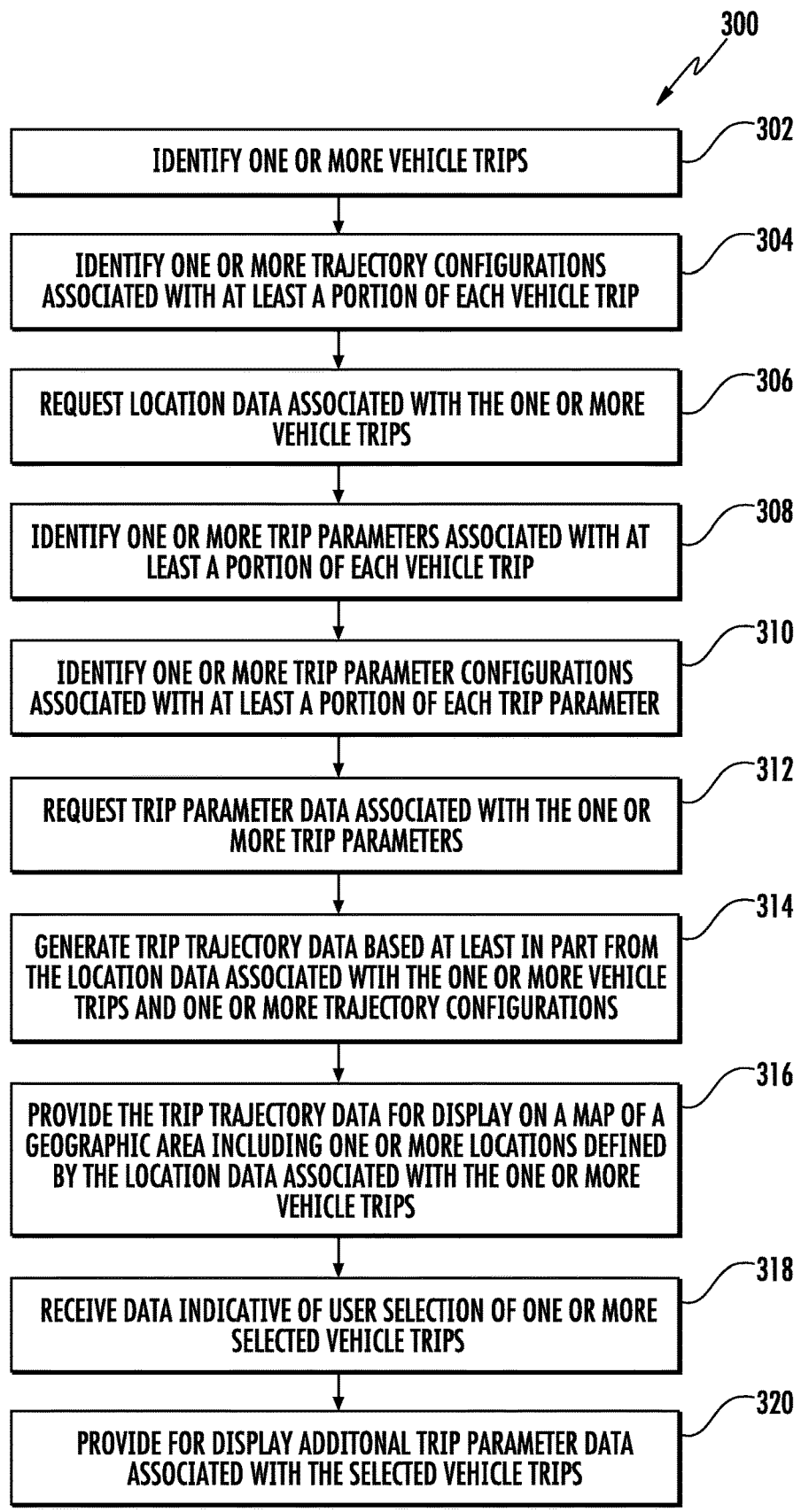
FIG. 11 depicts a flow chart of an example method for mapping trip trajectories according to example embodiments of the present disclosure.
Figure 13:
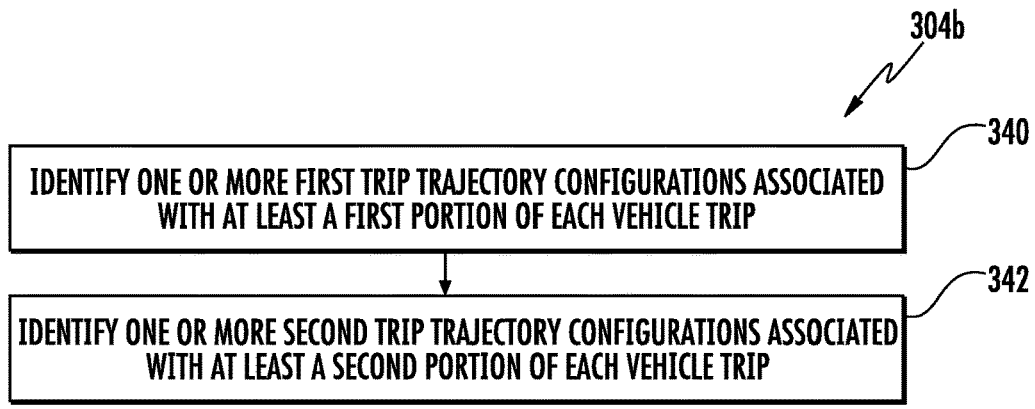
FIG. 13 depicts a flow chart of a second example method of identifying multiple different trajectory configurations according to example embodiments of the present disclosure.
Figure 14:
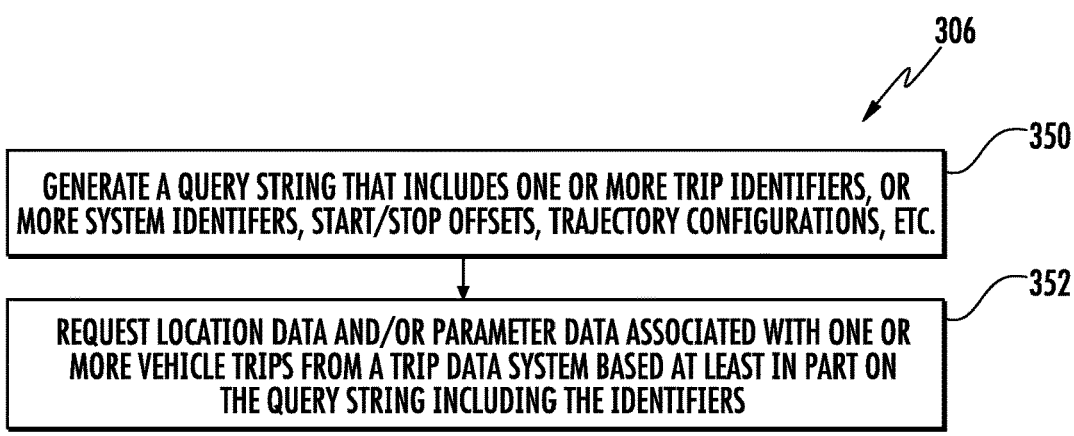
FIG. 14 depicts a flow chart of an example method of requesting location data associated with a vehicle trip according to example embodiments of the present disclosure.
Figure 15:
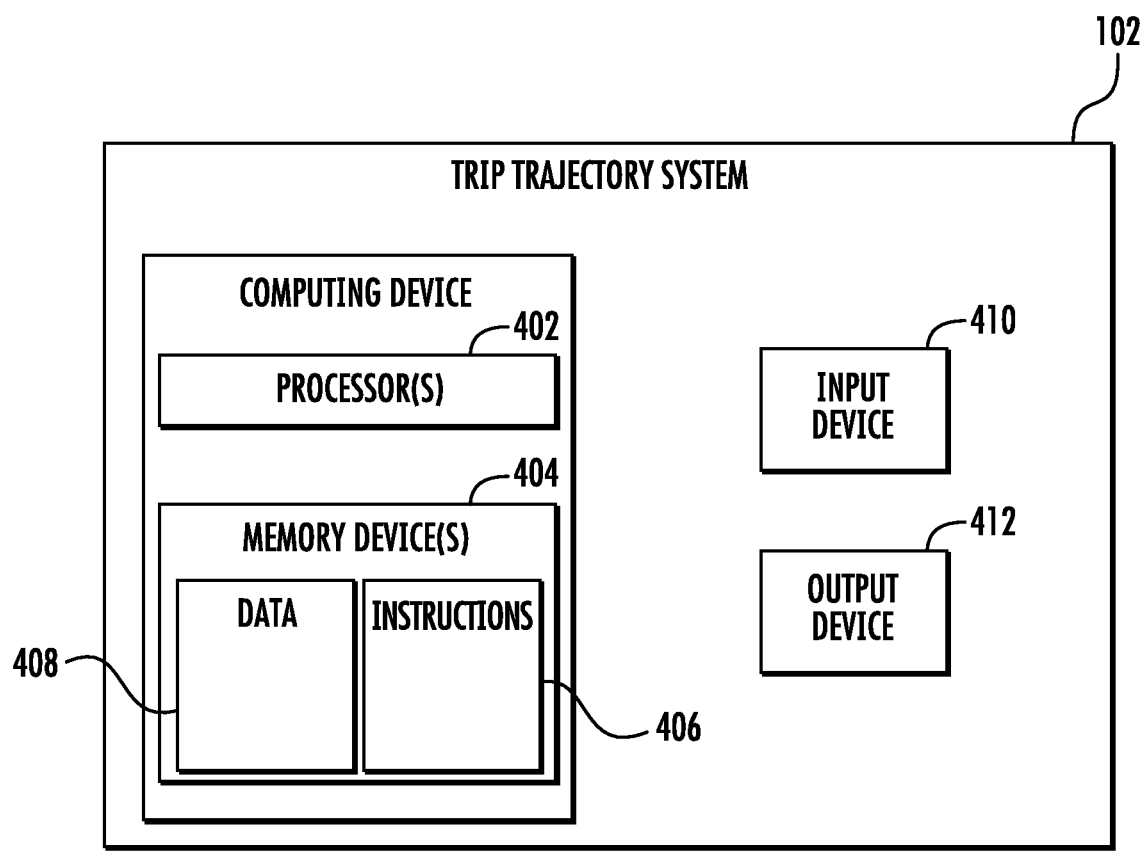
FIG. 15 depicts example system components of a trip trajectory system according to example embodiments of the present disclosure.

FIGS. 11-14 depict various flow charts for implementing features and aspects of various methods disclosed herein, which can be implemented using one or more computing devices as depicted in FIG. 15. Referring more particularly to FIG. 11, method (300) of mapping trip trajectories includes identifying (302) one or more vehicle trips. One or more vehicle trips can be identified at (302) using, for example, trip selection system 104 depicted in FIG. 1. Vehicle trips can be identified, for example, using one or more trip identifiers indicative of the one or more vehicle trips. Trip identifiers can be identified directly or indirectly by selecting icons representative of trips from a view portion (e.g., a chart or plot of multiple trips and/or vehicles), such as depicted in FIG. 10.

One or more trajectory configurations associated with the vehicle trips identified at (302) can be identified at (304). The one or more trajectory configurations identified at (304) can indicate, for example, a manner in which trip trajectory data associated with the location data for the vehicle trips identified at (302) should be generated. For example, different colors, patterns, icons and/or visual indicators can be identified at (304) as part of the trajectory configurations. In some examples, multiple trajectory configurations can be identified at (304) so that trip trajectories can be generated to include visually distinguishing features among different groups of trips, vehicles, parameters or the like.

Figure 12:
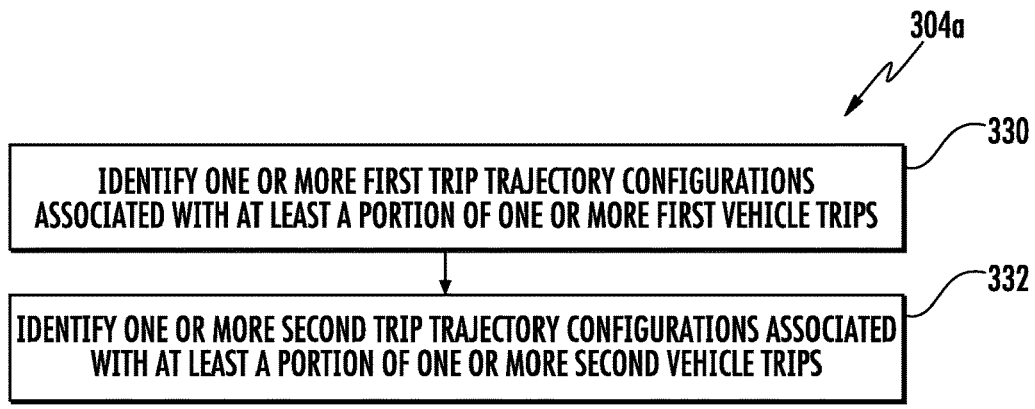
FIG. 12 depicts a flow chart of a first example method of identifying multiple different trajectory configurations according to example embodiments of the present disclosure.

FIG. 12 illustrates a first more particular example of identifying multiple different trajectory configurations. For example, one particular example of identifying multiple trajectory configurations at (304a) can include identifying one or more first trip trajectory configurations at (330) and identifying one or more second trip trajectory configurations at (332). In some examples, the one or more first trip trajectory configurations identified at (330) can be associated with at least a portion of one or more first vehicle trips, while the one or more second trip trajectory configurations identified at (332) can be associated with at least a portion of one or more second vehicle trips. An example of such first and second trip trajectory configurations is depicted in FIG. 5 where a first trip trajectory configuration (e.g., red/solid lines) is identified at (330) for a first group of aircraft flights (e.g., as represented by flight trajectories 212) and a second trip trajectory configuration (e.g., green/dotted lines) is identified at (332) for a second group of aircraft flights (e.g., as represented by flight trajectories 214).

FIG. 13 illustrates a second more particular example of identifying multiple different trajectory configurations. For example, one particular example of identifying multiple trajectory configurations at (304b) can include identifying one or more first trip trajectory configurations at (340) and identifying one or more second trip trajectory configurations at (342). In some examples, the one or more first trip trajectory configurations identified at (340) can be associated with at least a first portion of each vehicle trip, while the one or more second trip trajectory configurations identified at (342) can be associated with at least a second portion of each vehicle trip. An example of such first and second trip trajectory configurations is depicted in FIG. 6, where at least a first portion of each vehicle trip is associated with dual engine operation, which is depicted by first trajectory portions 222, 232 shown using a first color or pattern (e.g., solid lines). At least a second portion of each vehicle trip is associated with single engine operation (EOT mode), which is depicted by second trajectory portions 224, 234 shown using a second color or pattern (e.g., dotted lines).

Referring again to FIG. 11, method (300) can further include requesting (306) location data associated with the one or more vehicle trips identified at (300). Location data for each vehicle trip can be requested at (306) by a trip trajectory system 102 from a trip data system 120 as represented in FIG. 1. Location data requested at (306) can include latitude, longitude and/or altitude values of a vehicle at different points along a trip path. In some examples, the vehicle location data requested at (306) can be time-correlated location data such that each instance of recorded location data has an associated timestamp. In some examples, requesting (306) location data can include more particular aspects, as indicated in FIG. 14. For example, requesting (306) location data can include generating (350) a query string. The query string generated at (350) can include one or more identifiers, such as one or more trip identifiers indicative of the one or more vehicle trips identified at (302) and/or one or more system identifiers indicative of a trip data system from which location data is requested at (306). In some examples, a query string generated at (350) can correspond to a trip data query string 116 such as depicted and described with reference to FIG. 1. Location data associated with the one or more vehicle trips then can be requested at (352) from a trip data system (e.g., trip data system 120) based at least in part from the query string generated at (350), including the one or more identifiers in the query string.

Method (300) of FIG. 11 can further include generating (314) trip trajectory data based at least in part from the location data associated with the one or more vehicle trips identified at (302) and the one or more trajectory configurations identified at (304). The trip trajectory data generated at (314) then can be provided for display at (316) on a map of a geographic area including one or more locations defined by the location data associated with the one or more vehicle trips. In some examples, before generating (314) trip trajectory data and providing (316) such data for display, additional optional steps (308), (310) and (312) can be included such that parameter data related to a trip trajectory can also be generated at (314) and provided for display at (316). For example, one or more trip parameters associated with at least a portion of each vehicle trip identified at (302) can be identified at (308). One or more parameter configurations associated with at least a portion of each trip parameter identified at (308) can be identified at (310). Trip parameter data can also be requested at (312) from a trip data system (e.g., trip data system 120) using an API or other communication interface. An example of trip parameter data identified at (308) corresponds to airspeed as indicated in the example of FIG. 9. In the example of FIG. 9, parameter configurations identified at (310) can include a mapping formula that maps parameter values for the one or more trip parameters (e.g., airspeed) to a visual spectrum (e.g., a color gradient). Parameter configurations identified at (310) also can include icon definitions for indicating trip parameter data at one or more times or locations along a trip trajectory. In the example of FIG. 9, icon definitions associated with icons 264, 266, and 268 are identified at (310) corresponding to a point at which a last flap change occurred during flight, a point at which an aircraft put its landing gear down, and a point at which an aircraft reaches 1000 feet above ground.

Referring still to FIG. 11, the trip trajectory data provided for display at (316) can be interactive within a graphical user interface. As such, data indicative of user selection of one or more selected vehicle trips (e.g., aberrant flights) can be received at (318) from the trajectory data provided for display at (316). Additional trip parameter data (e.g., specific parameters associated with a particular vehicle trip) then can be retrieved (e.g., from trip data system 120) and provided for display at (320).

FIG. 15 depicts various system components for implementing trip trajectory system 102 and the various systems thereof (e.g., trip selection system 104, trip grouping system 106, trip parameter system 108, mapping system 110, trajectory viewing system 112, and/or APIs 114). Trip trajectory system 102 can include one or more computing devices 400. Although only one computing device 400 is illustrated in FIG. 15, multiple computing devices optionally may be provided at one or more locations for operation in sequence or parallel configurations to implement the disclosed methods and systems of mapping trip trajectories. In other examples, trip trajectory system 102 can be implemented using other suitable architectures, such as a single computing device. Each of the computing devices 400 in trip trajectory system 102 can be any suitable type of computing device, such as a general purpose computer, special purpose computer, laptop, desktop, mobile device, smartphone, tablet, wearable computing device, a display with one or more processors, or other suitable computing device.

Each computing device 400 can respectively include one or more processor(s) 402 and one or more memory devices 404. The one or more processor(s) 402 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices. The one or more memory devices 404 can include one or more computer-readable media, including, but not limited to, non-transitory computer-readable media, RAM, ROM, hard drives, flash drives, or other memory devices. In some examples, memory devices 404 can correspond to coordinated databases that are split over multiple locations. In some examples, the one or more memory devices 404 can include tangible, non-transitory computer-readable media storing computer-readable instructions that implement an application programming interface (API) for obtaining flight trajectory data executed on one or more computing devices.

The one or more memory devices 404 can store information accessible by the one or more processors 402, including instructions that can be executed by the one or more processors 402. For instance, memory device 404 can store instructions 406 for implementing processing rules, operations and algorithms to implement the functions set forth in method (300) and other aspects variously depicted in FIGS. 11-14. The one or more memory devices 404 also can include data 408 that can be retrieved, manipulated, created, or stored by the one or more processors 402. The data 408 stored at trip trajectory system 102 can include, for instance, one or more identified vehicle trips, one or more identified trajectory configurations, one or more identified trip parameters, one or more identified parameter configurations, one or more query strings, retrieved trip data and/or map data, and any other data required to implement the disclosed systems and methods.

Trip trajectory system 102 also can include various input/output devices for providing and receiving information to/from a user. For instance, an input device 410 can include devices such as a touch screen, touch pad, data entry keys, and/or a microphone suitable for voice recognition. Input device 410 can be employed by a user to provide input data entry or other information used by the disclosed trip trajectory mapping systems and methods, including but not limited to input data identifying one or more vehicle trips, one or more first trip trajectory configurations associated with one or more of a first portion of the one or more vehicle trips or a first set of vehicle trips, one or more second flight trajectory configurations associated with one or more of a second portion of the one or more vehicle trips or a second set of vehicle trips, one or more trip parameters, and one or more trip parameter configurations. An output device 412 can include audio or visual outputs such as speakers or displays for indicating trip trajectory mapping outputs, graphical user interfaces, and the like. In some examples, output device 412 includes a display device configured to provide output data in the form of one or more graphical user interfaces for receiving user instructions. The user instructions can then be identified upon receipt of user input via input device 410.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computing processes discussed herein may be implemented using a single computing device or multiple computing devices working in combination. Databases and applications may be implemented on a single system or distributed across multiple systems. Distributed components may operate sequentially or in parallel.

It will be appreciated that the computer-executable algorithms described herein can be implemented in hardware, application specific circuits, firmware and/or software controlling a general purpose processor. In one embodiment, the algorithms are program code files stored on the storage device, loaded into one or more memory devices and executed by one or more processors or can be provided from computer program products, for example computer executable instructions, that are stored in a tangible computer-readable storage medium such as RAM, flash drive, hard disk, or optical or magnetic media. When software is used, any suitable programming language or platform can be used to implement the algorithm.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of identifying a cost-savings measure associated with an engine-off taxiing parameter, the method comprising:
    determining with a computing device, trip location data comprising a first trajectory portion corresponding to one or more locations of a trip trajectory of a vehicle trip where engine-off taxiing is available and a second trajectory portion corresponding to one or more locations of the trip trajectory where engine-off taxiing was actually used;
    determining with the computing device, a cost-savings measure associated with using engine-off taxiing, the cost-savings measure based at least in part on trip parameter data corresponding to the vehicle trip, a first portion of the trip parameter data corresponding to the first trajectory portion and a second portion of the trip parameter data corresponding to the second trajectory portion;
    determining one or more trip parameter values corresponding to the cost-savings measure for the first portion of the trip parameter data and/or the second portion of the trip parameter data, and mapping the one or more trip parameter values to a visual spectrum based at least in part on a mapping formula, the mapping formula correlating colors and/or patterns to a range of parameter values for the one or more trip parameter values; and
    transmitting with the computing device, trip trajectory data configured to cause a display device to display a map of a geographic area corresponding to at least a portion of the trip location data, with at least part of the first trajectory portion and/or the second trajectory portion mapped to the geographic area, and with the one or more trip parameter values displayed at one or more geographic locations along the at least part of the first trajectory portion and/or the second trajectory portion.

2. The method of claim 1, wherein determining trip location data comprises:
    generating a query string that comprises one or more trip identifiers indicative of the one or more vehicle trips; and
    requesting location data associated with the one or more vehicle trips from a trip data system based at least in part on the query string.

3. The method of claim 2, wherein the query string comprises one or more system identifiers indicative of the trip data system.

4. The method of claim 1, comprising:
    determining with the computing device, trip location data comprising a third trajectory portion corresponding to one or more locations of a trip trajectory of the vehicle trip where engine-off taxiing, while available, is not used.

5. The method of claim 4, comprising:
    transmitting trip trajectory data configured to cause the display device to display the map of the geographic area corresponding to at least a portion of the trip location data, with at least part of the third trajectory portion mapped to the geographic area, and with the one or more trip parameter values displayed at one or more geographic locations along the at least part of the third trajectory portion.

6. The method of claim 1, wherein the trip trajectory data is configured to cause the display device to display the first trajectory portion in a first color or pattern, and the second trajectory portion in a second color or pattern.

7. The method of claim 1, wherein the trip trajectory data is configured to cause the display device to display one or more icon definitions at one or more locations along the first trajectory portion and/or the second trajectory portion.

8. The method of claim 1, further comprising:
    receiving with the computing device, data indicative of user selection of one the vehicle trip from among a plurality of vehicle trips.

9. The method of claim 1, wherein the trip trajectory data is provided in a keyhole markup language (KML) file format.

10. The method of claim 1, wherein determining the trip location data comprises determining the vehicle trip from among a plurality of vehicle trips based at least in part on a unique flight identifier.

11. The method of claim 1, wherein determining the trip location data comprises determining the vehicle trip from among a plurality of vehicle trips based at least in part on a user selection from a graphical user interface.

12. The method of claim 1, comprising:
    determining a first trajectory configuration corresponding to the first trajectory portion and/or a second trajectory configuration corresponding to the second trajectory portion, the first trajectory configuration and the second trajectory configuration defining color values corresponding to the one or more trip parameter values; and
    wherein the trip trajectory data comprises data configured to cause the display device to display the color values corresponding to the one or more trip parameter values along a trajectory line representing the location data.

13. The method of claim 1, comprising:
    determining a first trajectory configuration corresponding to the first trajectory portion and/or a second trajectory configuration corresponding to the second trajectory portion, the first trajectory configuration and the second trajectory configuration defining lines of varied length corresponding to the one or more trip parameter values; and wherein the trip trajectory data comprises data configured to cause the display device to display the lines of varied length corresponding to the one or more trip parameter values along a trajectory line representing the location data.

14. The method of claim 1, wherein the trip parameter data comprises data recorded or derived from a vehicle data recorder or an engine data recorder.

15. The method of claim 14, wherein the trip parameter data comprises a control input parameter, a trip dynamics parameter, and/or a static logic parameter.

16. A trip trajectory system, comprising:
a computing device comprising a processor and a memory; and
a display device;
wherein the memory comprises computer-executable instructions, which when executed by the processor, cause the processor to:
determine trip location data comprising a first trajectory portion corresponding to one or more locations of a trip trajectory of a vehicle trip where engine-off taxiing is available and a second trajectory portion corresponding to one or more locations of the trip trajectory where engine-off taxiing was actually used;
determine a cost-savings measure associated with using engine-off taxiing, the cost-savings measure based at least in part on trip parameter data corresponding to the vehicle trip, a first portion of the trip parameter data corresponding to the first trajectory portion and a second portion of the trip parameter data corresponding to the second trajectory portion;
determine one or more trip parameter values corresponding to the cost-savings measure for the first portion of the trip parameter data and/or the second portion of the trip parameter data, and map the one or more trip parameter values to a visual spectrum based at least in part on a mapping formula, the mapping formula correlating colors and/or patterns to a range of parameter values for the one or more trip parameter values; and
transmitting trip trajectory data configured to cause a display device to display a map of a geographic area corresponding to at least a portion of the trip location data, with at least part of the first trajectory portion and/or the second trajectory portion mapped to the geographic area, and with the one or more trip parameter values displayed at one or more geographic locations along the at least part of the first trajectory portion and/or the second trajectory portion.

17. The system of claim 16, wherein determine with a computing device, trip location data comprises:
generate a query string that comprises one or more trip identifiers indicative of the one or more vehicle trips; and
request location data associated with the one or more vehicle trips from a trip data system based at least in part on the query string.

18. The system of claim 16, wherein the trip trajectory data is configured to cause the display device to display one or more icon definitions at one or more locations along the first trajectory portion and/or the second trajectory portion.

19. The system of claim 16, wherein the vehicle trip is determined from among a plurality of vehicle trips based at least in part on a user selection from a graphical user interface.

20. A non-transitory computer-readable medium comprising computer-executable instructions, which when executed by a processor, cause the processor to:
determine trip location data comprising a first trajectory portion corresponding to one or more locations of a trip trajectory of a vehicle trip where engine-off taxiing is available and a second trajectory portion corresponding to one or more locations of the trip trajectory where engine-off taxiing was actually used;
determine a cost-savings measure associated with using engine-off taxiing, the cost-savings measure based at least in part on trip parameter data corresponding to the vehicle trip, a first portion of the trip parameter data corresponding to the first trajectory portion and a second portion of the trip parameter data corresponding to the second trajectory portion;
determine one or more trip parameter values corresponding to the cost-savings measure for the first portion of the trip parameter data and/or the second portion of the trip parameter data, and map the one or more trip parameter values to a visual spectrum based at least in part on a mapping formula, the mapping formula correlating colors and/or patterns to a range of parameter values for the one or more trip parameter values; and
transmitting trip trajectory data configured to cause a display device to display a map of a geographic area corresponding to at least a portion of the trip location data, with at least part of the first trajectory portion and/or the second trajectory portion mapped to the geographic area, and with the one or more trip parameter values displayed at one or more geographic locations along the at least part of the first trajectory portion and/or the second trajectory portion.

* * * * *